United States Patent
Miyazawa

(10) Patent No.: US 7,342,961 B2
(45) Date of Patent: *Mar. 11, 2008

(54) ENCODED DATA OUTPUTTING APPARATUS AND METHOD

(75) Inventor: Satoshi Miyazawa, Kanagawa (JP)

(73) Assignee: Sony Corporation, Tokyo (JP)

(*) Notice: Subject to any disclaimer, the term of this patent is extended or adjusted under 35 U.S.C. 154(b) by 531 days.

This patent is subject to a terminal disclaimer.

(21) Appl. No.: 11/078,128

(22) Filed: Mar. 10, 2005

(65) Prior Publication Data

US 2005/0190833 A1 Sep. 1, 2005

Related U.S. Application Data

(63) Continuation of application No. 09/380,242, filed as application No. PCT/JP98/06003 on Dec. 28, 1998, now Pat. No. 6,868,121.

(30) Foreign Application Priority Data

Dec. 31, 1997 (JP) .................................. 9-368116

(51) Int. Cl.
*H04N 7/12* (2006.01)
(52) U.S. Cl. ............................................... 375/240.01
(58) Field of Classification Search ............. 348/385.1, 348/387.1, 14.12, 419.1, 465, 441, 384.1, 348/12, 13, 14, 15, 16, 700, 701, 154, 155, 348/431, 452, 399, 397, 469; 375/240.01, 375/240.07, 240.11, 240.18; 386/109, 111, 386/112, 124, 125
See application file for complete search history.

(56) References Cited

U.S. PATENT DOCUMENTS 5,686,963 A 11/1997 Uz et al.
5,845,083 A 12/1998 Hamadani et al.
6,198,878 B1 * 3/2001 Blawat et al. ............... 386/111
6,313,863 B1 11/2001 Chida
6,498,625 B1 12/2002 Yamamoto et al.
6,868,121 B2 * 3/2005 Miyazawa ............. 375/240.07
2005/0190837 A1 * 9/2005 Miyazawa ............. 375/240.07

FOREIGN PATENT DOCUMENTS

| EP | 0 588 669 A2 | 3/1994 |
| EP | 0 784 409 A2 | 7/1997 |
| JP | 7-99603 | 4/1995 |
| JP | 8-98160 | 4/1996 |
| JP | 8-102952 | 4/1996 |
| JP | 9-252290 | 9/1997 |
| JP | 9-312625 | 12/1997 |
| WO | WO 97/35435 | 9/1997 |

* cited by examiner

*Primary Examiner*—Behrooz Senfi
(74) *Attorney, Agent, or Firm*—Frommer Lawrence & Haug LLP; William S. Frommer; Thomas F. Presson

(57) ABSTRACT

With respect to change of a bit rate at the time of transmitting encoded data TS, a system delay is fixed and the output size of data frame_bit [j] every predetermined data unit is successively calculated, thereby making it possible to continuously obtain data from the buffer 103 of a decoding side without breaks irrespective of change of the bit rate.

1 Claim, 15 Drawing Sheets

ENCODED DATA OUTPUTTING APPARATUS AND METHOD

This is a continuation of U.S. patent application Ser. No. 09/380,242, filed Aug. 27, 1999, now U.S. Pat. No. 6,868,121 WHICH IS A 371 OF PCT/JP98/06003 filed Dec. 28, 1998.

TECHNICAL FIELD

The present invention relates to an encoded data outputting apparatus and method, and more particularly, is preferably applicable to an encoded data outputting apparatus and method for multiplexing and transmitting video data and audio data.

BACKGROUND ART

Heretofore, in a digital broadcasting system, as shown in FIG. 1, video data is compression-encoded in the MPEG (Moving Picture Experts Group) scheme with a video encoder 1, compression-encoded data ES is stored in an encoder FIFO2 and then transmitted to a decode buffer 3 of a decoding side as a transport stream TS. The decoder 4 reads out data which is stored in the decode buffer 3, at predetermined timing and decodes it.

In such a digital broadcasting system, approximately equivalent encoded data is transmitted to the decode buffer 3 every predetermined timing, thereby preventing the decode buffer 3 from overflow or underflow.

However, in the digital broadcasting system which transmits encoded data at a fixed rate, overflow or underflow occurs in a decode buffer if the transmission rate is variable for transmission.

DISCLOSURE OF INVENTION

The present invention has been made in view of the aforementioned point. The object of this invention is to propose an encoded data outputting apparatus and method in which it is possible to prevent a decode buffer from failing even if encoded data is transmitted at a variable rate.

In order to solve such a problem, in the present invention, the size of encoded data to be output from a buffer means provided at an output terminal of an encoding means in a predetermined unit different from an encoding processing unit is controlled based on encoding information output from the encoding means every encoding processing unit of the encoding means.

Encoding information includes the size of generated codes for each encoding processing unit, and the size of encoded data to be output is controlled according to the size of generated codes, thereby constantly controlling a delay from the buffer means to the buffer of decoding side to which the encoded data is output. Therefore, it is possible to prevent the buffer of decoding side from failing if the transmission rate is varied according to the size of generated codes.

BEST MODE FOR CARRYING OUT THE INVENTION

Figure 1:
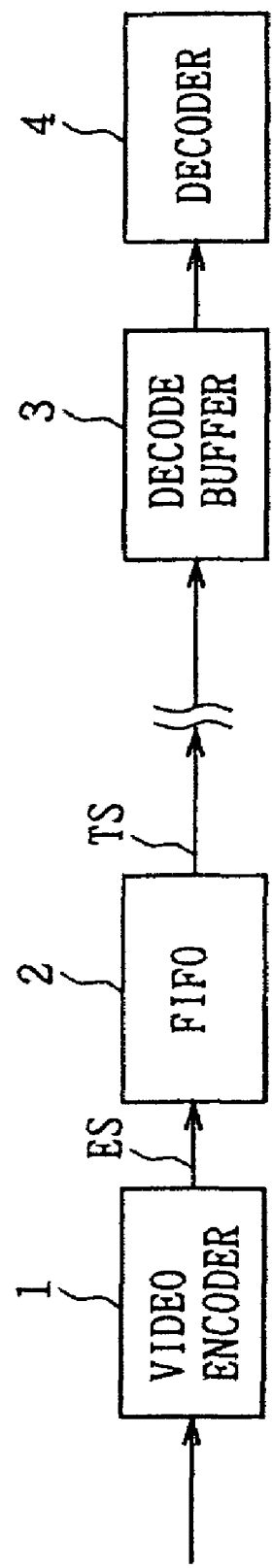
FIG. 1 is a block diagram showing a conventional digital broadcasting system.

One embodiment of the present invention will be described in detail by referring to the drawings.

(1) The Whole Construction

Figure 2:
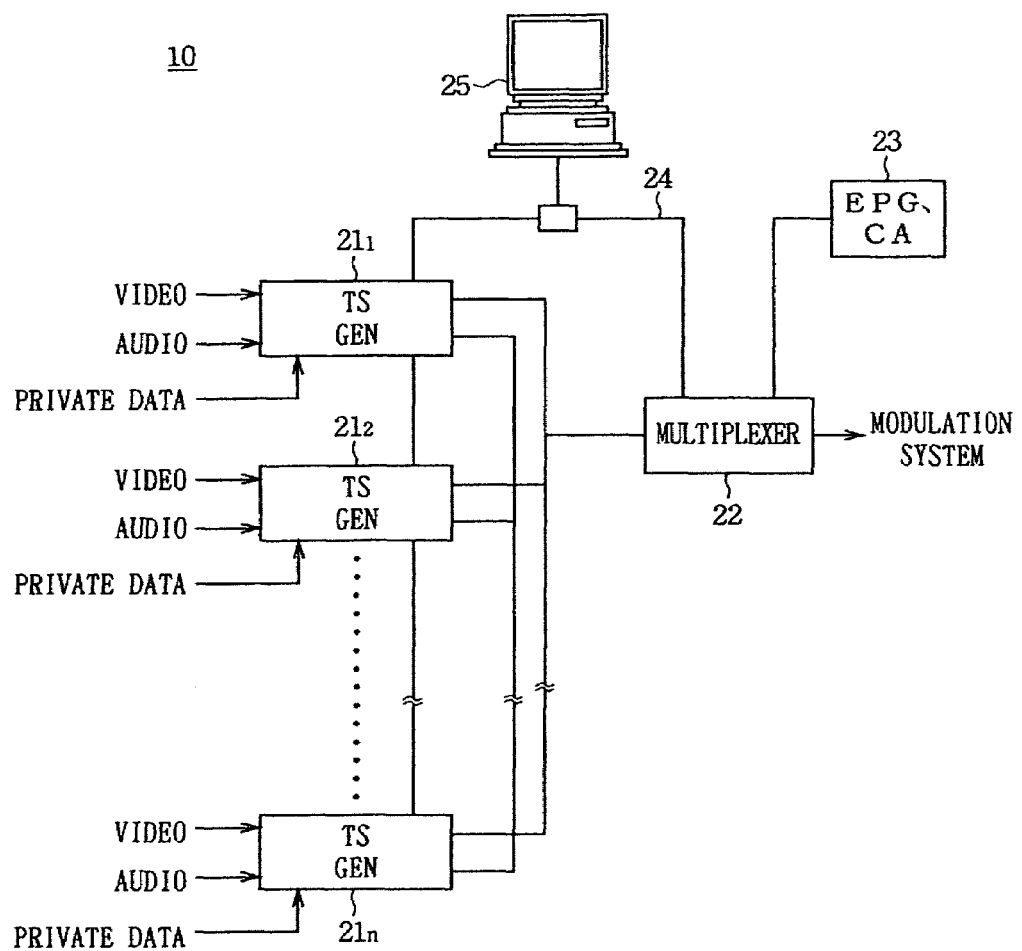
FIG. 2 is a block diagram showing an encoding system according to the present invention.

FIG. 2 shows the constitution of an encoding system 10, in which each transport stream generating apparatus $21_1$, $21_2$, ..., $21_n$ for n-channels receives video data, audio data, and private data (additional data), and encodes them in the MPEG2.

Each transport stream generating apparatus $21_1$, $21_2$, ..., $21_n$ calculates an encoding difficulty degree which varies according complication of a picture when encoding the video data, and transmits the calculation result (difficulty #1 to difficulty#n) to a computer 25 through a LAN 24 such as an Ether-net.

The computer 25 assigns the transport stream generating apparatuses $21_1$, $21_2$, ..., $21_n$ target encoding video rates (target_bit_rate#1 to terget_bit_rate#n) proportioning to respective encoding difficulty degrees, based on encoding difficulty degree information (difficulty #1 to difficulty#n) which are outputted from the transport stream generating apparatuses $21_1$, $21_2$, ..., $21_n$. Therefore, a high target encoding video rate is assigned to a transport stream generating apparatus which encodes an complicated picture or a high-speed picture, and on the other hand, a low target encoding video rate is assigned to a transport stream generating apparatus which encodes a picture having a low encoding difficulty degree.

Each transport stream generating apparatus $21_1$, $21_2$, ..., $21_n$ controls the encoding rate at the target encoding video rate (target_bit_rate#1 to target_bit_rate#n) supplied from the computer 25, and transmits the output data to a multiplexer 22.

The multiplexer 22 multiplexes EPG (Electronic Program Guide) data, program guide information and CA information (setting information of parameter concerning a stream) supplied from a CA (Conditional Access) data generator 23, and a transport stream supplied from each transport stream generating apparatus 21₁, 21₂, . . . , 21ₙ, for each channel.

In this connection, the multiplexer 22 includes a transmission path encoder such as a scramble and an error correction encoder, performs these processing on multiplexed data, and then outputs them to a QSK modulator.

Figure 3:
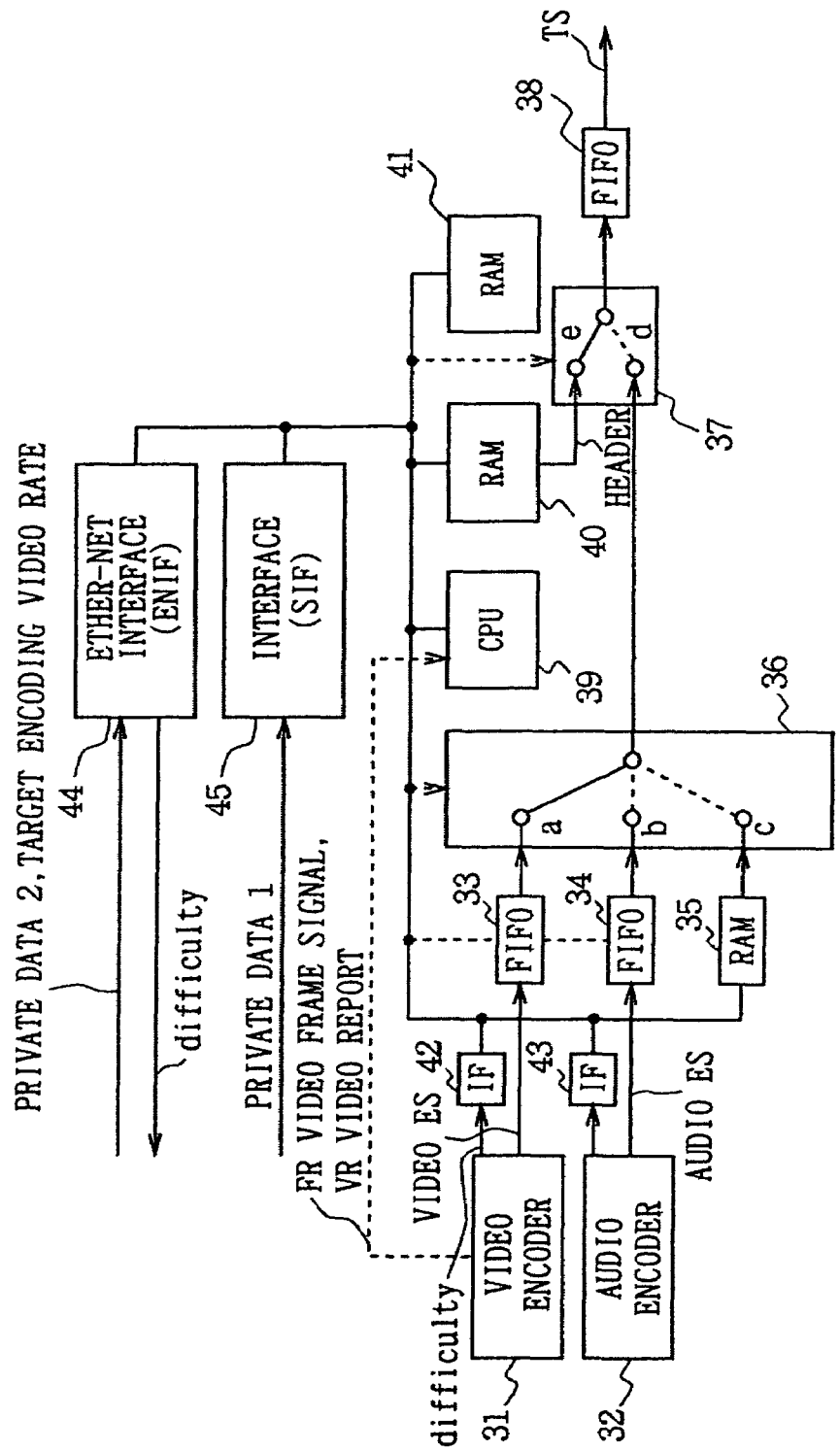
FIG. 3 is a block diagram showing the construction of a transport stream generating apparatus according to the present invention.

Each transport stream generating apparatus 21₁, 21₂, . . . , 21ₙ has the constitution as shown in, for example, FIG. 3. The explanation below will show an example of multiplexing data for one channel. In FIG. 3, a video encoder 31 compression-encodes video data input from external equipment such as a switcher in, for example, the MPEG2. A video elementary stream from the video encoder 31 is supplied to an encoder FIFO (First In First Out) buffer 33 serving as a buffer memory.

At this time, once the video encoder 31 takes the difficulty degree information (difficulty) in a CPU 39, and transmits it to the computer 25 (FIG. 2) via an Ether-net interface 44.

The audio encoder 32 compression-encodes audio data input from the external equipment, in the MPEG2 scheme, for example, to generate an audio stream which has approximately equivalent data for each audio frame having a predetermined length, and transmits it to the encoder FIFO buffer 34. In an MPEG audio layer 2 performs encoding and decoding with 1152 samples as one audio frame. As a sampling frequency, a frequency of 48 kHz, 44.1 kHz, or 32 kHz or another frequency is used. Therefore, the one audio frame is 24 ms, 26.1 ms, or 36 ms corresponding to each sampling frequency. The transmission rate for the-audio elementary stream from the audio encoder 32 is a fixed rate, for example, 384 k[bit/s].

Further, a RAM 35 is provided as a memory for private data. Streams-output from the encoder FIFO buffers 33, 34, and the RAM 35 are supplied to input terminals a, b, c, respectively, of the multiplexer 36 formed of a switch circuit. A stream selected by the multiplexer 37 is output as a transport stream TS via the FIFO buffer 38.

In the transport stream generating apparatus shown in FIG. 3, the CPU 39, the RAM 40 connected to the CPU39 with a CPU bus, interfaces 42 and 43 for calculating data size, the Ether-net interface 44, and a serial interface 45 are provided to control multiplexing of the elementary streams.

Private data 1 and private data 2 are supplied to the CPU bus via the Ether-net interface 44 and the serial interface 45, respectively. The private data includes subtitle, additional audio information, text information, user data, and the like.

The CPU 39, whenever receiving a video report VR outputted from the video encoder in a picture unit, plans a reading schedule which will be described later, reads out a video elementary stream stored in the FIFO buffer 33 in accordance with the plan, and transmits it to the multiplexer 36. The multiplexer 36 selects any of input terminals a, b, c in accordance with the control of a control signal from the CPU 39, to select any of elementary streams input to the respective input terminals. The multiplexer 37 which receives a stream multiplexed by the multiplexer 36 is controlled by the control signal from the CPU 39.

Note that, the multiplexer 36 outputs predetermined blank data (continued logical values 1 or 0) without selecting any of the input terminals a, b, c, in the case where there is no elementary stream to be input to any of the input terminals, in the case of performing stuffing processing, or the like.

The multiplexer 37 selects any of input terminals d, e in accordance with the control of the control signal, selects and multiplexes the elementary stream from the input terminal d and header data (TS packet header or PES packet header) from the input terminal e, and outputs the result to the FIFO buffer 38.

The FIFO buffer 38 performs buffering on the data stream multiplexed by the multiplexer 37, and outputs the resultant as a transport stream TS to external equipment (not shown) such as a multiplexer for multiplexing streams for plural channels.

The transport stream from the multiplexer 37 may be output to a storage device such as a hard disk device and an optical magneto disc device for storage, according to necessity.

The data size interface 42 and 43 calculate data size for each frame or field of the video stream and the audio stream input from the video encoder 31 and the audio encoder 32, and supplied the calculation result to the CPU 39 through the CPU bus. The data size of the private stream is known by the CPU 39, so that the data size interface for the private stream is not necessary.

The data size is calculated by a counter provided in each of the data size interfaces 42, 43. Further, the data size interfaces 42, 43 themselves can detect the data size for each frame of the elementary streams outputted from the video encoder 31 and the audio encoder 32.

The Ether-net interface 44 receives the private data 2 input through the LAN (not shown) such as an Ether-net, and outputs it to the CPU 39 through the CPU bus. The serial interface 45 receives the private data 1 in a serial form input from the computer, for example, and outputs it to the CPU 39 through the CPU bus.

The CPU 39 is composed of, for example, a microprocessor, a ROM for storing programs, and the peripheral circuits, and controls the transport stream generating apparatus so that the transport stream generating apparatus performs a desired operation. Specifically, the CPU 39 supplies a target video encoding rate to a bit rate control circuit of the video encoder 31, for example.

In addition, the CPU 39 uses control data stored in the RAM 40 for control data to generate the contents of an adaptation field including PCR (Program Clock Reference) information and a PES (Packetized Elementary Stream) packet header. The generated header is memorized in the RAM 41 for processing and is output through the input terminal e and an output terminal of the multiplexer 37. In this way, the multiplexing for the elementary stream is performed by the multiplexer 36, and the PES packet header and the TS packet header are added by the multiplexer 37. As a result, the transport stream generating apparatus shown in FIG. 3 converts the elementary stream into both of PES packet and TS packet.

Further, the CPU 39 decides an order of elementary streams to be multiplexed, the size of data to be multiplexed of each elementary stream, based on the data size input from the data size interfaces 42 and 43, the target encoding bit rate (target_bit_rate) input from the Ether-net interface 44, and the remaining recording capacity (the remaining capacity of buffer) of the encoder FIFO buffers 33, 34, so as to control the multiplexers 36, 37 based on the decision. At this time, timing adjustment for multiplexing and the like are also performed.

The RAM 40 for processing is a memory for storing the data size and the like which are used when the CPU 39 performs processing described above. Specifically, the header generated by the CPU 39 is memorized in the RAM 40, is output from the RAM 40 to the input terminal e of the multiplexer 37, and is inserted on the transport stream.

Further, the data showing the size of encoded data the CPU 39 reads from the data size interface 42, 43, or the like, once the private data input via the Ether-net interface 44 or the serial interface 45, and the like are stored in the RAM for processing, and are processed by the CPU 39.

The RAM 41 for control data is a memory for storing control data for the processing of the CPU 39. In the RAM 41 for control data, control data, schedule data, and the like for creating header data are stored, for example.

Figure 4:
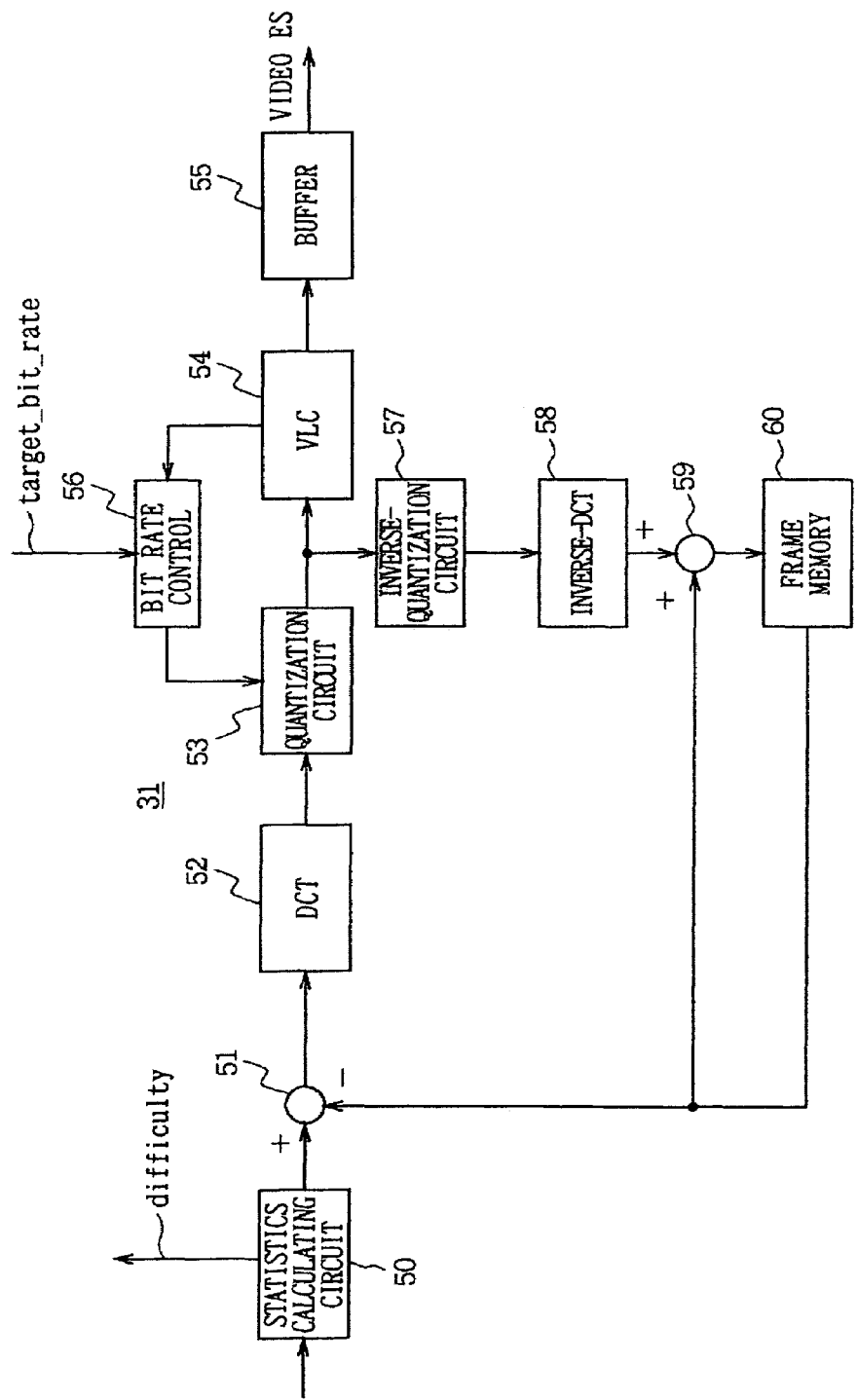
FIG. 4 is a block diagram showing the construction of a video encoder according to the present invention.
Figure 5:
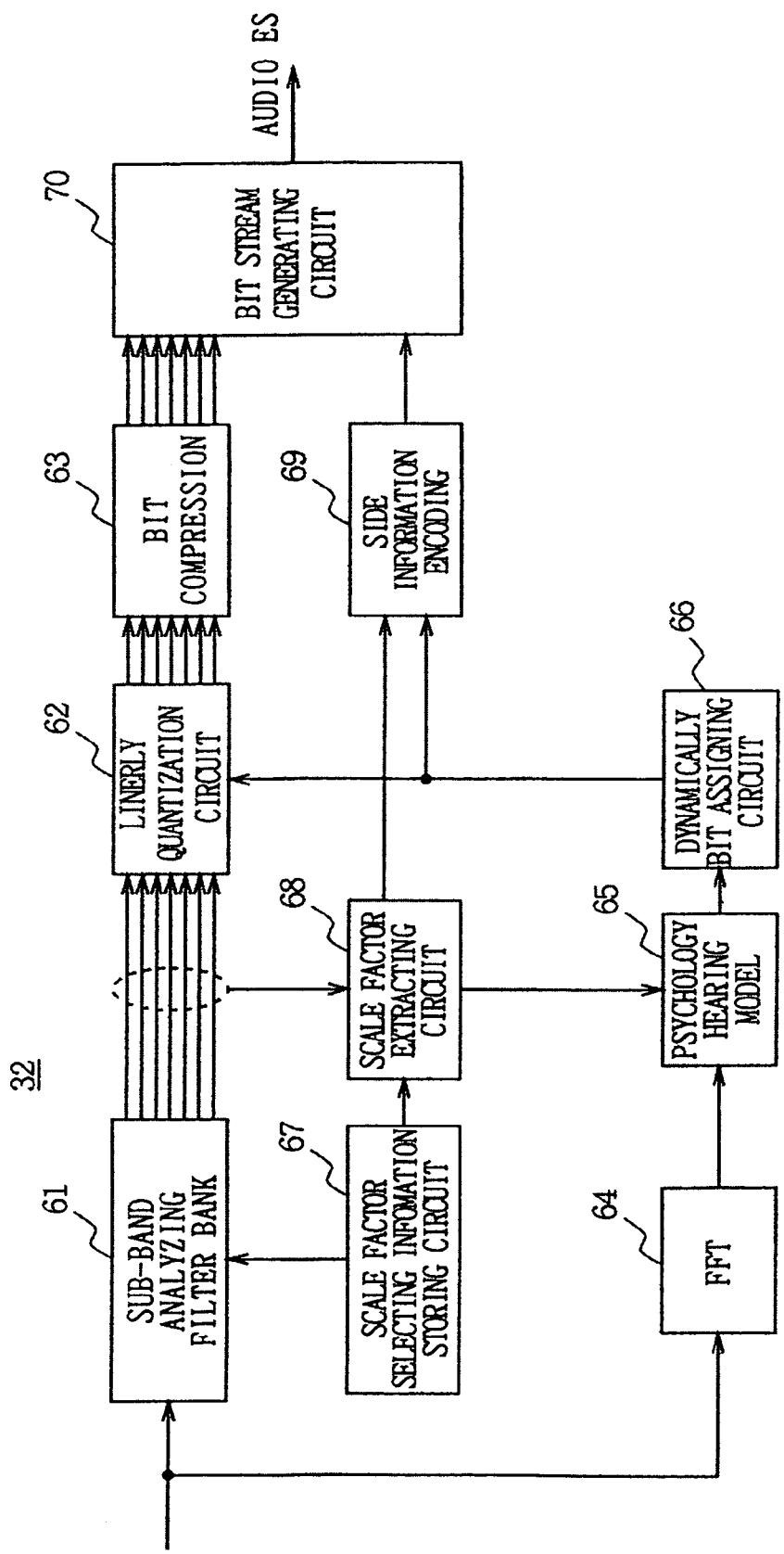
FIG. 5 is a block diagram showing the transition of an audio encoder.

The video encoder 31 has the constitution shown in FIG. 4. That is, the statistics calculating circuit 50 for calculating an encoding difficulty degree from the input video data, a subtracting circuit 51 for calculating a difference between the input video data and the local decoded video data, a DCT circuit 52 for DCT-converting an output of the subtracting circuit 51, a quantization circuit 53 for quantizing coefficient data from the DCT circuit 52, a variable length encoding circuit 54 for variable-length-encoding an output of the quantization circuit 53, and a buffer memory 55 for taking out as an output of the variable length encoding circuit 54 at a fixed rate are provided. Information on the size of data generated in the variable length encoding circuit 54 is supplied to the bit rate control circuit 56 and the quantization scale is controlled. Thereby the generated data size is controlled. Further, a local decoder comprising an inverse-quantization circuit 57, an inverse-DCT circuit 58, an adding circuit 59, and a frame memory 60 is provided.

In addition, a motion detector is provided for detecting a motion vector in a macro block unit, through it is not shown in the figure. The frame memory 60 is controlled for a motion compensation based on this motion vector.

Note that, in the case of MPEG, there are three types of picture. That is, there are an I(intra)-picture which is an intra-frame encoded picture, a P(predictive)-picture which is an inter-frame forward direction predictive encoded picture, and a B(bidirectionally predictive)-picture which is a bidirectionally predictive picture. As in the case of this picture type, there are three types of macro block. That is, there are an intra-frame encoded macro block, a forward inter-frame predictive macro block-for predicting the future from the past, a backward inter-frame predictive macro block for predicting the past from the future, and an interpolative macro block for prediction from both of the future and the past.

All macro blocks in the I-picture is intra-frame encoded macro blocks. Further the P-picture includes the intra-frame encoded macro blocks and the forward inter-frame predictive macro blocks. Furthermore, the B-picture includes all four types of macro blocks. In the case where the local decoded data is formed according to these macro blocks and the predictive encoding is performed, the subtracting circuit 51 calculates a difference, and in the case of the intra-frame encoding, it does not calculate a difference and input video data exists in an output of the subtracting circuit 51.

The CPU 39 of the above-mentioned transport stream generating apparatus supplies the target encoding video rate (target_bit_rate) to the bit rate control circuit 56 of the video encoder 31. The bit rate control circuit 56 controls the quantization circuit 53 so that the size of compression-encoded data is equal to the set target encoding video rate (target_bit_rate), based on the data size of the video elementary stream actually generated by the variable length encoding circuit 54.

The audio encoder 32 is composed of a sub-band analyzing filter bank (SAFB) 61, a linearly quantization circuit 62, a bit compressing circuit 63, a FFT (Fast Fourier Transfer) circuit 64, a psychology hearing model 65, a dynamically bit assigning circuit 66, a scale factor selecting information storing circuit 67, a scale factor extracting circuit 68, a side information encoding circuit 69, and a bit stream generating circuit 70.

The audio encoder compression-encodes audio data input from external equipment in the MPEG2 scheme to form an audio stream, and output it to the encoder FIFO buffer 34 and the data size interface 43.

In an example of the present invention described above, each transport stream generating apparatus $21_1, 21_2, \ldots, 21_n$ multiplexes the video-elementary stream, the audio elementary stream and the private elementary stream, to generate a transport stream TS of the MPEG2.

Thus, the multiplexer 22 described above in FIG. 2 multiplexes transport streams TS supplied from the transport stream generating apparatuses $21_1, 21_2, \ldots, 21_n$ at respective target encoding video rates (target_bit_rate#1 to target_bit_rate#n) according to their encoding difficulty degrees (difficulty#1 to difficulty#n), and transmits the multiplex result to a receiving side via the QSK modulator. Thus, a transport stream TS generated by encoding video data having the high encoding difficulty degree is transmitted at a high transmission rate to the receiving side, and a transport stream TS generated by encoding video data having a low encoding difficulty degree is transmitted to the receiving side at a low transmission rate.

At the receiving side, once the received data is stored in a decode buffer (VBV (Video Buffering Verifier) Buffer), ant when the storage size reaches the-previously set storage size, the decoder reads the data stored in the decode buffer to start decoding at once.

Figure 6:
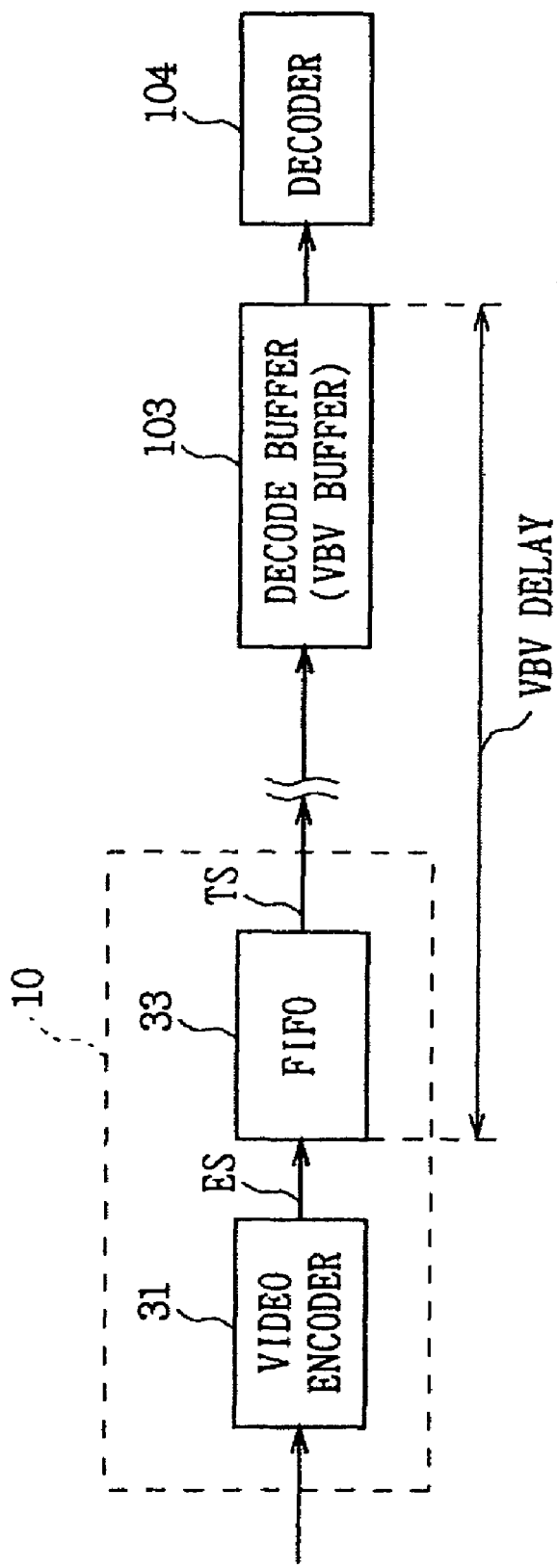
FIG. 6 is a block diagram explaining a VBV delay.

In this connection, FIG. 6 shows the video encoder 31 and the encoder FIFO 33 of any of transport stream generating apparatuses $21_1, 21_2, \ldots, 21_n$ of the encoding system 10 described above in FIGS. 2 and 3, and the decode buffer 103 and the decoder 104 of the receiving side. Each transport stream generating apparatus $21_1, 21_2, \ldots, 21_n$ of the encoding system 10 performs such a transmission that a VBV delay of each transport stream becomes constant even if the target encoding video rate (target_bit_rate) is varied in accordance with the encoding difficulty degree (difficulty) of input video data. The VBV delay of each transport streams means the period from timing of inputting the video elementary stream ES output from the video encoder 31 to the encoder FIFO 33 until the input video elementary stream is read out from the encoder FIFO 33, is passed through the decode buffer (VBV buffer) 103 of the receiving side, starts being decoded by the decoder 104.

In this embodiment, the transmission plan of the transport stream TS in a frame unit from the encoder FIFO 33 of each transport-stream generating apparatus $21_1, 21_2, \ldots, 21_n$ to the decode buffer 103, and the VBV delay is set to 22 frames.

Hereinafter, the reason why the transmission delay is set to 22 frames will be explained. In the MPEG2 scheme, a delay value at the time of transmitting a transport stream TS is expressed by 16 bits. Therefore, the maximum delay value expressed by 16 bits becomes FFFF (65535). And, since the counter of the encoding system 10 drives at 90 [kHz], the maximum of delay value is 65535/90000=0.73 [second]. Accordingly, the transmission delay in the MPEG2 may be considered up to the maximum value 0.73 [second] which is expressed by 16 bits, and it is 21.9 frames by converting 0.73 [second] into the number of frames each corresponding to 1/30 [second].

Therefore, in this embodiment, the minimum number of frames (22 frames) which exceeds 21.9 frames is set as the VBV delay, thereby making it possible to transmission at the maximum delay value by the MPEG2 standard.

Hereinafter, processing for fixing the VBV delay of the transport stream TS will be explained.

Figure 7:
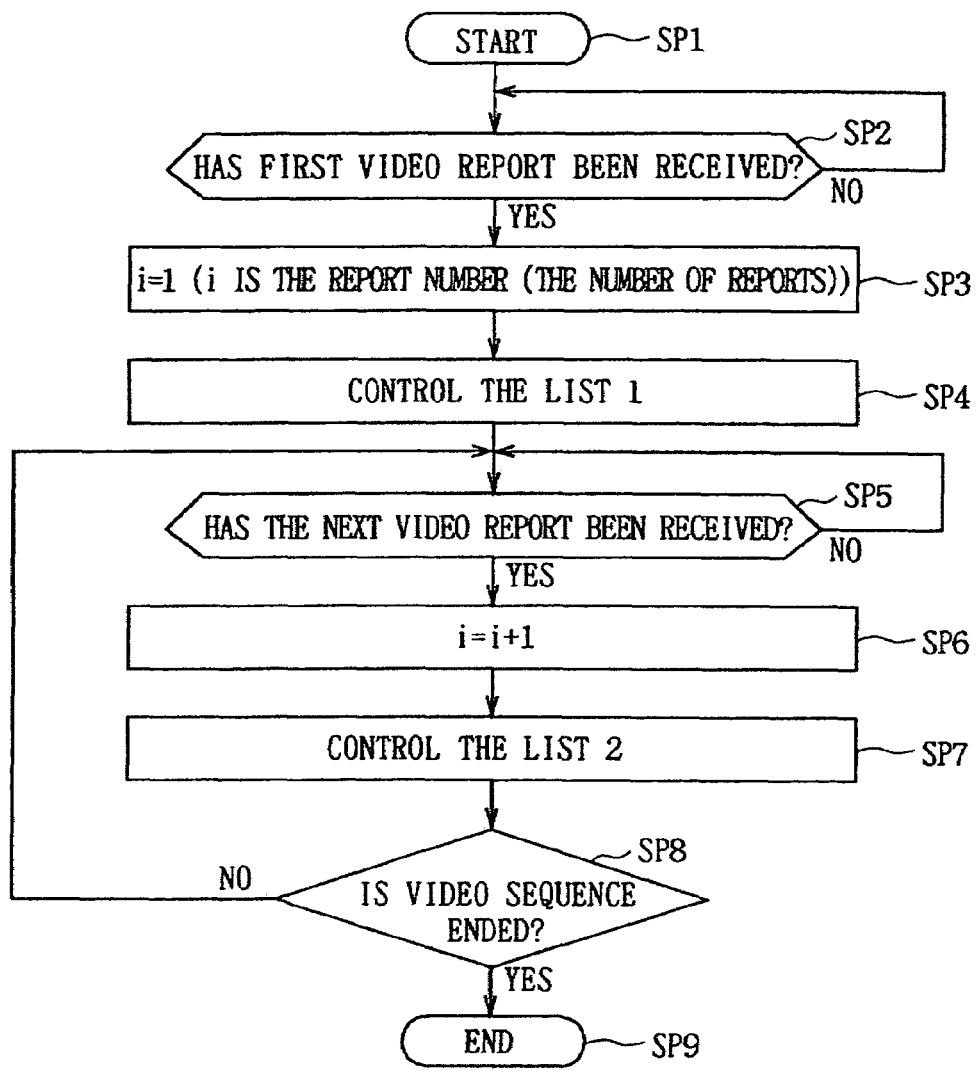
FIG. 7 is a flowchart showing explaining a transmission plan and its execution according to the present invention.

FIG. 7 shows a processing procedure of reading data from the encoder FIFO 33, which is carried out by the CPU 39 of each transport stream generating apparatus $21_1$, $21_2$, . . . , $21_n$. This processing procedure fixes the VBV delay so as to prevent the VBV buffer of the receiving side from overflow or underflow.

That is, in FIG. 7, when the video encoder 31 starts encoding processing, the CPU 39 enters the reading processing procedure from step SP1, and at following step SP2, judges whether the first video report VR1 has been received from the video encoder 31 or not. A negative result here means that the video encoder 31 does not complete the encoding processing for one picture yet and the video report is not output. In this case, the CPU 39 repeats the processing of step SP2 to wait for the video report output from the video encoder 31.

Figure 8:
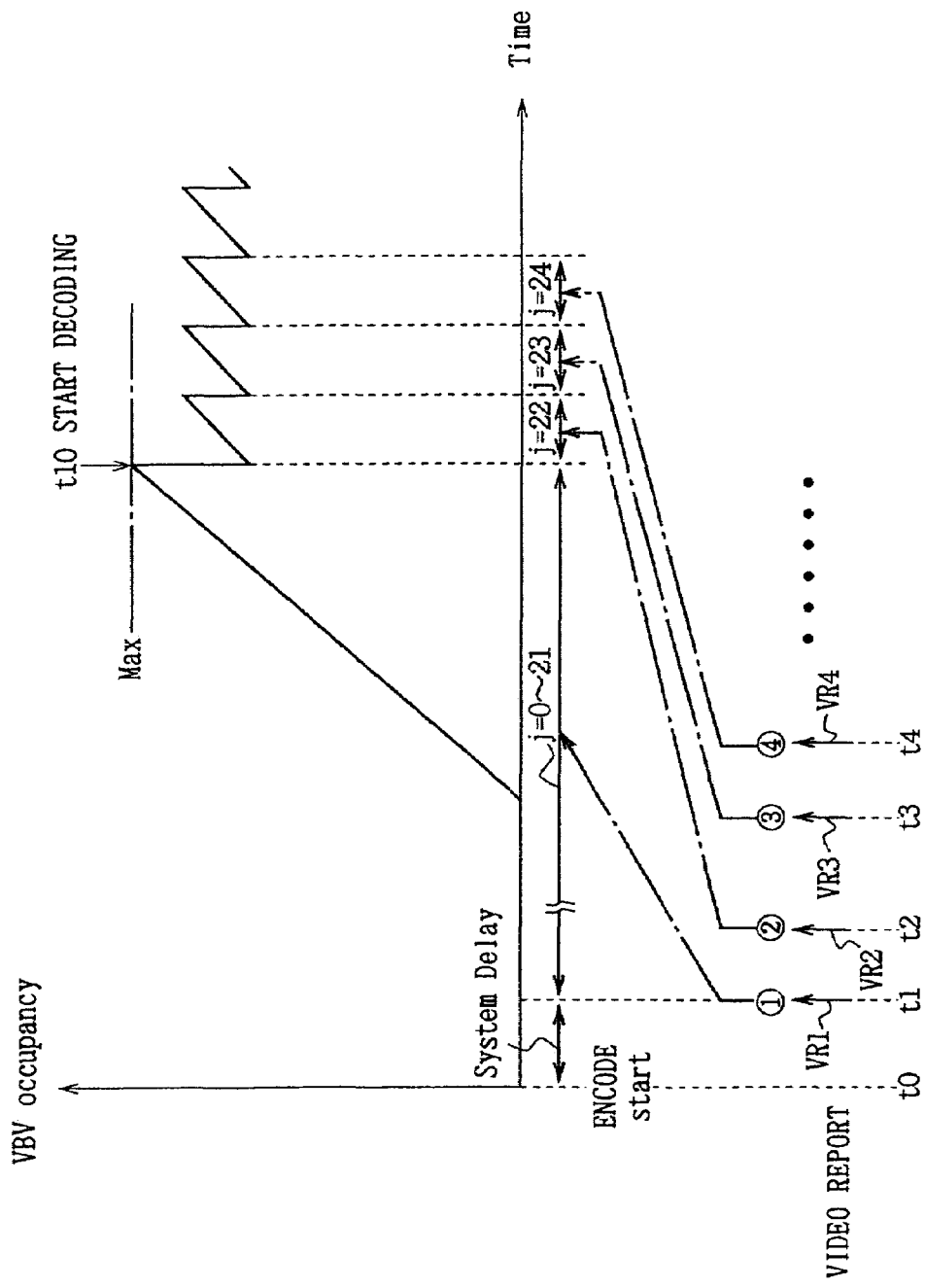
FIG. 8 is a schematic diagram explaining the transmission plan.

This waiting state corresponds to a system delay after the video encoder 31 starts encoding at time t0 until the encoding for one picture is completed at time t1 and the video report VR1 is output from the video encoder 31, as shown in FIG. 8.

When completing the encoding processing for the first one picture, the video encoder 31 outputs the first video report VR1 to the CPU 39. Thereby the CPU obtains an affirmative result at step SP2 shown in FIG. 7 and then proceeds to step SP3. At step SP3, the CPU 39 substitutes one for the number i of video report output from the video encoder 31, and executes control of the list 1 described later at following step SP4. Thereby, the CPU 39 makes the transmission plan for the transport stream TS for 22 frames (frame_bit [0] to frame_bit [21]) to the decode buffer 103 until the time t10 (FIG. 8) when the decoder 104 starts decoding the transport stream TS of the first frame, and starts executing this plan, based on the data size (field_bit [i]) for each field included in the first video report VR1.

In this case, the CPU 39 makes such a transmission plan that the size of data stored in the decode buffer (VBV buffer) 103 reaches the maximum capacity (1.75 [Mbit]) at time t10 when time (one frame is equivalent to ⅓₀ [second]) for 22 frames (frame [0] to frame [21]) being the VBV delay has passed since time t1 of outputting the first video report VR1 from the video encoder 31 to the CPU 39. In accordance with this plan, the transport stream ST for the first 22 frames (frame_bit [0] to frame_bit [21]) is read out from the encoder FIFO 33 and output to the decode buffer 103 through a transmission system.

Then, at following step SP5, the CPU 39 judges whether the next (second) video report is received from the video encoder 31 or not. A negative result here means that the video encoder 31 is not complete the encoding processing of the second picture yet. In this case, the CPU 39 repeats the processing of step SP5 to wait for receiving the next video report.

When the affirmative result is obtained at step SP5, the CPU 39 proceeds to following step SP6 to set the number i of video report to i+1, and then proceeds to step SP7. Step SP7 is a processing step for making and executing the transmission plan every one frame to be decoded by the decoder 104 from the time t10 described in FIG. 8 whenever a video report after the second video report is output from the video encoder 31 to the CPU 39. The CPU 39 first makes a plan of reading the 23rd frame (frame_bit [22]) from the encoder FIFO 33 based on the second report pulse VR2 and transmitting it to the decode buffer (VBV buffer) 103 at the processing step, actually reads data of the 23rd frame (frame_bit [22]) from the encoder FIFO 33 and transmits it to the decode buffer (VBV buffer) 103 through a transmission system, following the transport stream TS for 22 frames which starts being transmitted at the processing of step SP4.

The transmission plan for the 23rd frame is made at step SP7, and then the CPU 39 proceeds to step SP8 to judge whether the video sequence is ended or not. When an affirmative result is obtained, the processing procedure is completed. On the contrary, a negative result at step SP8 means that the encoding processing is still continued by the video encoder 31. In this case, the CPU 39 returns to step SP5 described above to wait for the next video report VR3 outputted from the video encoder 31.

In this way, when the first video report VR1 is output from the video encoder 31, the CPU 39 makes a transmission plan for the first to 22nd frames based on this first video report VR1 so that the VBV delay becomes a delay for 22 frames, and starts executing this plan. Moreover, when receiving the second video report VR2, the CPU 39 makes the, transmission plan for the 23rd frame based on the second video report VR2, and further, when receiving the third video report VR3, makes a transmission plan for the following 24th frame. Then, the transmission plans for frames after 25th frame are sequentially made until the video sequence is completed whenever the video report is received, and data equivalent to the generated code size is sequentially read out from the encoder FIFO 33 and output to the decode buffer (VBV buffer) 103 in a frame unit, following the 22nd frame. As a result, the VBV delay for the first 22 frames is kept. Accordingly the VBV delay is controlled so as to be constant even if the size of codes generated in the video encoder 31 is varied, thereby making it possible to prevent the decode buffer (VBV buffer) 103 from overflow or underflow.

Figure 9:
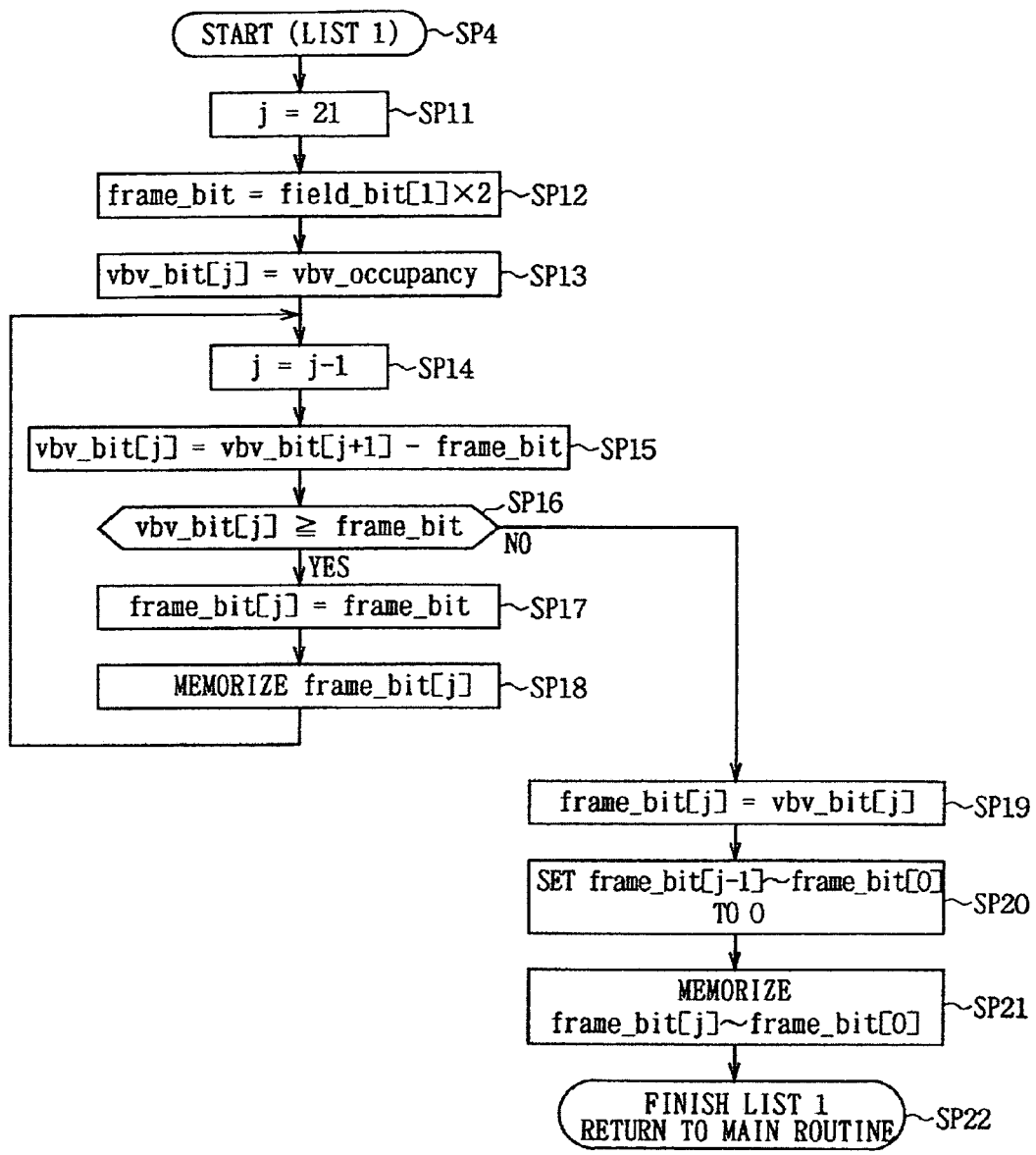
FIG. 9 is a flowchart explaining the transmission plan and its execution based on the first video report.

Here, the processing of step SP4 shown in FIG. 7 will be explained in detail. FIG. 9 shows a processing procedure of step SP4 in detail. The CPU 39 enters step SP4, lets j=21 at following step SP11, and sets the value twice the generated code size of field (field_bit [1]) included in the video report VR1 to the size of frame bits (frame_bit) at following step SP12. In this connection, the field_bit [1] is obtained by the target_bit_rate/60 based on the target generated code size (target_bit_rate) of the video encoder 31.

Thus, at step SP12, the size of frame bits for the first picture to be input to the encoder FIFO 33 is obtained, and at following step SP13, the CPU 39 subtracts the maximum capacity (vbv occupancy) of the VBV buffer 103 for the size of bits (vbv_bit [j]) occupying the VBV buffer 103, corresponding to the picture [j] (j=21, that is, the 22nd picture).

Figure 10:
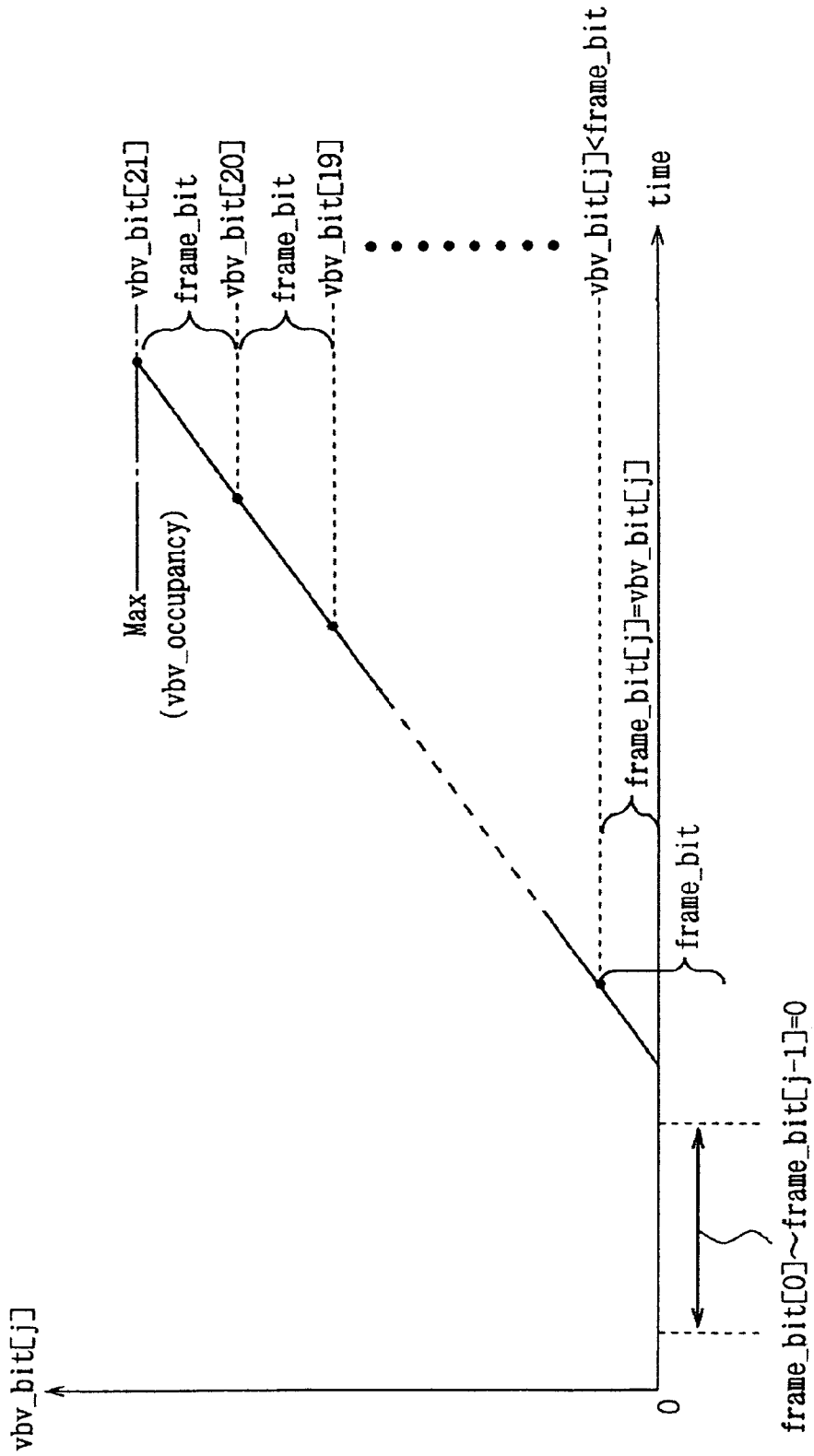
FIG. 10 is a schematic diagram explaining timing of transmitting encoded data and the size of encoded data to be transmitted.

Thereby, as shown in FIG. 10, the size of bits (vbv_bit [21]) occupying the VBV buffer 103 corresponding to the 22nd picture [21] is assigned as the maximum capacity, and the read size (frame_bit [j]) from the encoder FIFO 33 corresponding to the first picture in a frame unit is calculated with the maximum capacity as a reference.

That is, the CPU 39 proceeds to step SP14 to let j=j−1 (=20), and at following step SP15, subtracts the difference between the aforementioned size of occupying bits (vbv_bit [21]) and the size of frame bits (frame_bit) obtained at step SP12 for the then size of bits (vbv_bit [20]) occupying the VBV buffer 103.

The CPU 39 judges at step SP16 whether the size of occupying bits (vbv_bit [20]) is over the size of frame bits (frame_bit) or not. An affirmative result here means that the size of occupying bits (vbv_bit [20]) is larger than the size of frame bits (frame_bit) obtained at step SP12 and that the size of frame bits (frame_bit) can be read out from the encoder FIFO 33 at the last read timing. The CPU 39 proceeds to step SP17 to subtract the size of frame bits (frame_bit) obtained at step SP12 for the size of read frame bits (frame_bit [j], j=20)

Thereby, the size of read frame bits (frame_bit [j], j=20) at the time when the 21st picture is read out from the encoder FIFO 33 in a frame unit is obtained, and the CPU 39 memorizes the obtained size of bits at step SP18.

By repeating the processing of step SP14 to step SP18 in this way, the size of frame bits when the 22nd, the 21st, . . . pictures are read out from the encoder FIFO 33 in a frame unit is sequentially assigned as the size of frame bits obtained at step SP12.

In this way, when the VBV buffer 103 is set so that its data size becomes the maximum by reading the 22nd picture input to the encoder FIFO33 with the size of frame bits (frame_bit) obtained at step SP12 and thereafter, setting is performed in such a way that respective pictures are read out with the size of frame bits (frame_bit) obtained at step SP12 in the order of the 21st, 20th, . . . pictures, it is difficult to read out the size of frame bits (frame_bit) at timing of reading out a picture.

At this time, since the CPU 39 obtains a negative result at step SP16 shown in FIG. 9, it proceeds to step SP19 and the then size of occupying bits (vbv_bit [j]) in the VBV buffer 103 is substituted for the size of read frame bits (frame_bit [j]).

Then, at following step SP20, the CPU 39 set all values of the size of read frame bits (frame_bit [j−1]) of pictures prior to picture (frame) in which the size of occupying bits (vbv_bit [j]) of the VBV buffer 103 is substituted for the size of read frame bits (frame_bit [j]), to "0" at step SP19, and memorizes the set value "0" at step SP21.

Thus, the CPU 39, using the size of frame bits (frame_bit) of the first picture, memorizes the size of read frame bits (frame_bit [0] to frame bit [21]) of the first picture to the 22nd picture, reads out the first picture (frame) to the 22nd picture (frame) from the encoder FIFO 33 in accordance with the size of read frame bits (frame_bit [0] to frame_bit [21]) to transmit them to the decode buffer (VBV buffer) 103, and thereby the size of data in the decode buffer becomes full at the time when the 22nd picture (frame) is input to the decode buffer 103. At a result, after the first video report VR1 is output from the video encoder 31 to the CPU 39 (that is, after the first picture is input from the video encoder 31 to the encoder FIFO 33), decoding is started in the decoder 104 after 22 frames.

In this way, the transmission plan for the first picture to the 22nd picture is made based on the first video report VR1, and when the plan is started, the CPU 39 makes the transmission plan for pictures after 23rd picture at step SP7 of the main routine described above in FIG. 7.

In this case, the CPU 39 makes the transmission plan for pictures after the 23rd picture by using the size of bits generated for each picture. In this connection, the transmission unit for each picture written in the encoder FIFO 33 is a frame unit.

Figure 11:
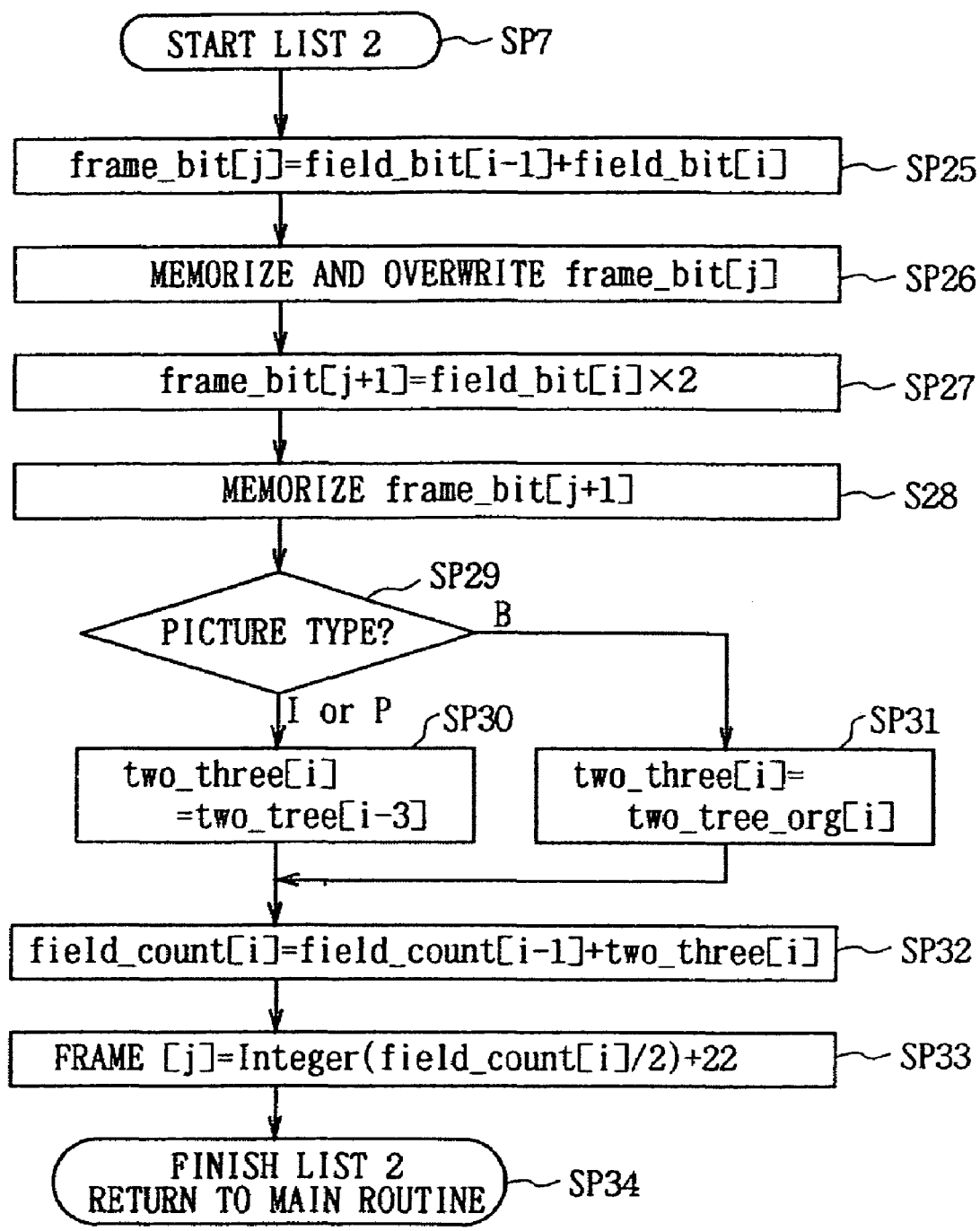
FIG. 11 is a flowchart explaining the transmission plain and its execution based on the second video report.

FIG. 11 shows a detailed processing procedure for step SP7. The CPU 39 first obtains the size of 23rd read frame bits (frame_bit [j], j=22) from the sum of the size of field bits of the 23rd picture (field_bit [i], i=22) and the size of field bits of the 22nd picture (field_bit [i−1], i=21). In this case, i is a number of video reports at step SP25.

Then, the CPU 39 memorizes the size of 23rd frame bits, which is obtained at step SP25, at step SP26, and proceeds to step SP27. The CPU 39 obtains the size of read field bits of the 24th picture (field_bit [j+1], j=22) by doubling the size of field bits of the 23rd picture (field_bit [i], i=22) at step SP27, and memorizes the obtained size of read frame bits (frame_bit [j+1], j=22) at step SP28.

Figure 12:
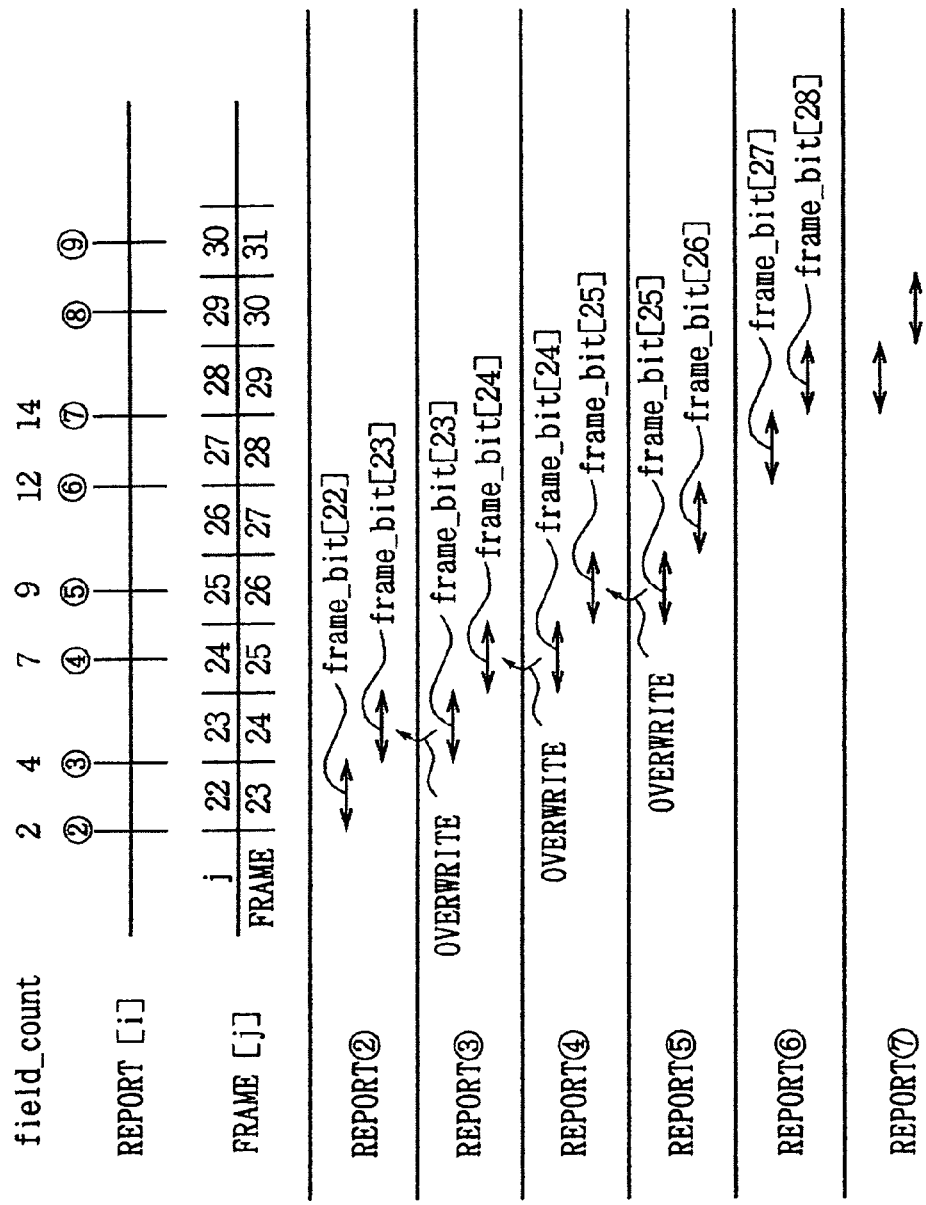
FIG. 12 is a schematic diagram explaining the transmission plan of video data subjected to pull-down processing.

In this way, as shown in FIG. 12, each of the size of rate bits of the 23rd picture (frame_bit [22]) and the size of frame bits of the 24th picture (frame_bit [23]) is obtained based on the 2nd video report VR2.

Here, when video data which is obtained by pull-down-converting the picture of a movie film (24 [frame/second]) into a television signal of 30 [frame/second] is input to the video encoder 31, a picture (pull down 2) comprised of two fields and a picture (pull down 3) comprised of three fields are mixed as input video data.

Figure 13:
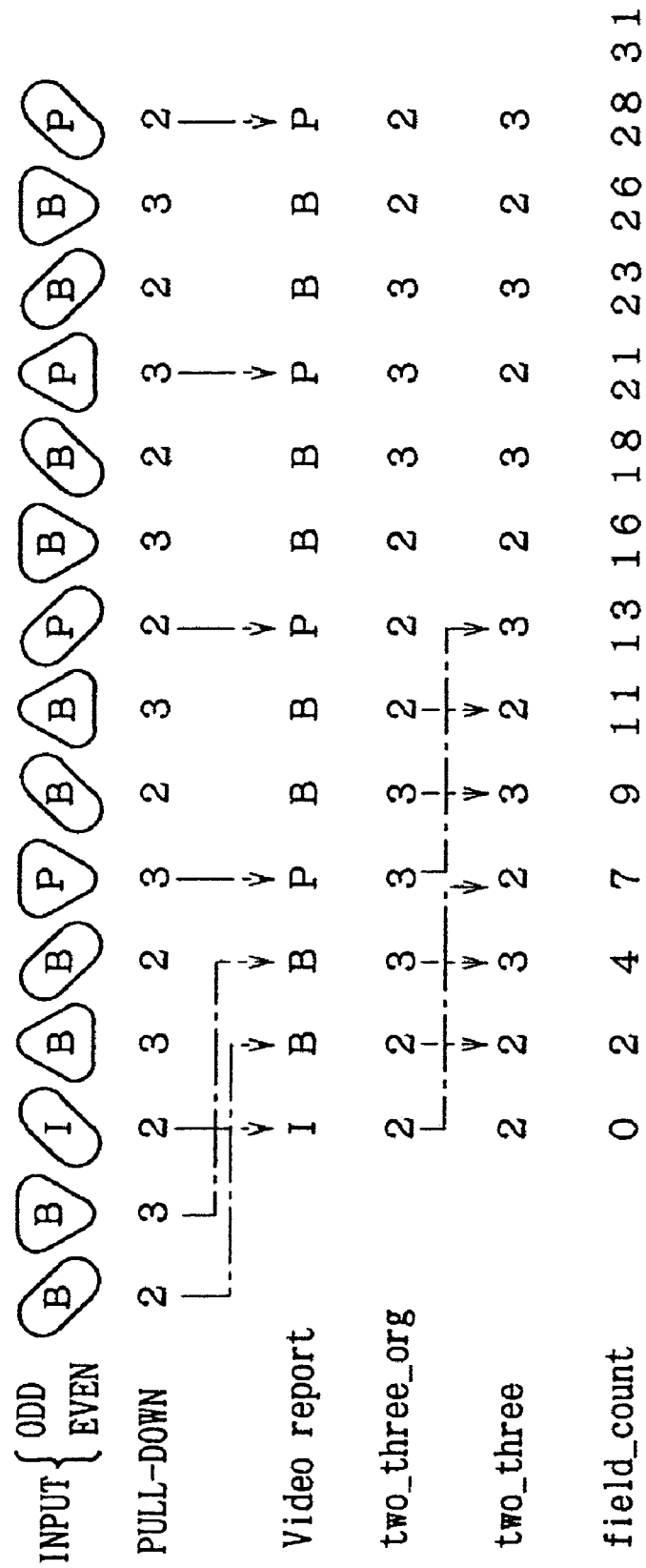
FIG. 13 is a schematic diagram explaining the transmission plan of video data subjected to pull-down processing.

And, in the encoding processing of the video encoder 31, the order of pictures to be input as input video data is changed according to their picture types (I-picture, P-picture, and B-picture). The video report is output from the video encoder 31 to the CPU 39 in the changed order of pictures. Accordingly, the construction of field (two-field constitution or three-field constitution) constituting a picture is also changed. This change result is included in the video report as two-three-org in FIG. 13 to supply it to the CPU 39.

In this case, relative to the fact that the field constitution of the input video data is repetition of the two-field constitution and the three-field constitution, in the result (two_three_org) of the changed field constitution, the case where the two-field constitution is continued and the case where the three-field constitution is continued occur. If the case where the two-field constitution is continued and the case where the three-field constitution is continued occur, the VBV buffer 103 underflows or overflows. So, the CPU 39 applies the field constitution of three picture before to the I-picture and P-picture to use this as a new field constitution two-three.

The above processing is executed at step SP29, step 30, and step SP31, in which the value of field count of one picture before (field_count [i−1]) is added to the field constitution (two_three [i]) decided according to the picture type at step SP30 and step SP31, so that the new value of field count (field_count [i]) is obtained.

The value of field count is a result of adding the number of fields in succession from the 23rd picture. The CPU 39 executes the processing of step SP33 by using thus obtained value of field count (field_bit [i]). This processing is to decide the new number of frame to be read out as the size of read frame bits by adding the value "22" to the result (integral number) of omitting the places of decimals of the value obtained by dividing the value of field count (field_bit [i]) by two. For example, assuming that the value of field count (field_bit [i]) is seven, the read frame number (frame [j]) obtained at step SP33 is 25 (that is, j=24). On the other hand, assuming that the value of field count (field_bit [i]) is nine, the read frame number (frame [j]) obtained at step SP33 is 26 (that is, j=25).

When the read frame number is-obtained in this way, for example, the size of frame bits (frame_bit [25]) is memorized in the 26th frame number based on the fifth video report ⑤ and moreover, the size of frame bits (frame_bit [26]) is memorized in the number of 27th frame in FIG. 12. Thereafter, the frame number (frame [j]) to be memorized based on the new video report ⑥ is able to be raised as the size of frame bits (fram_bit [27]) of the 28th frame number, without being overwritten as the size of frame bits of the 27th frame number, so that the frame number according to the mixture of the two-field constitution and the three-field constitution is able to be assigned.

Thus, the CPU 39 returns to the main routine of FIG. 7 from step SP34 of FIG. 11, and receiving the next video report, makes and executes the read plan with respect to frames after the 23rd frame.

Figure 14:
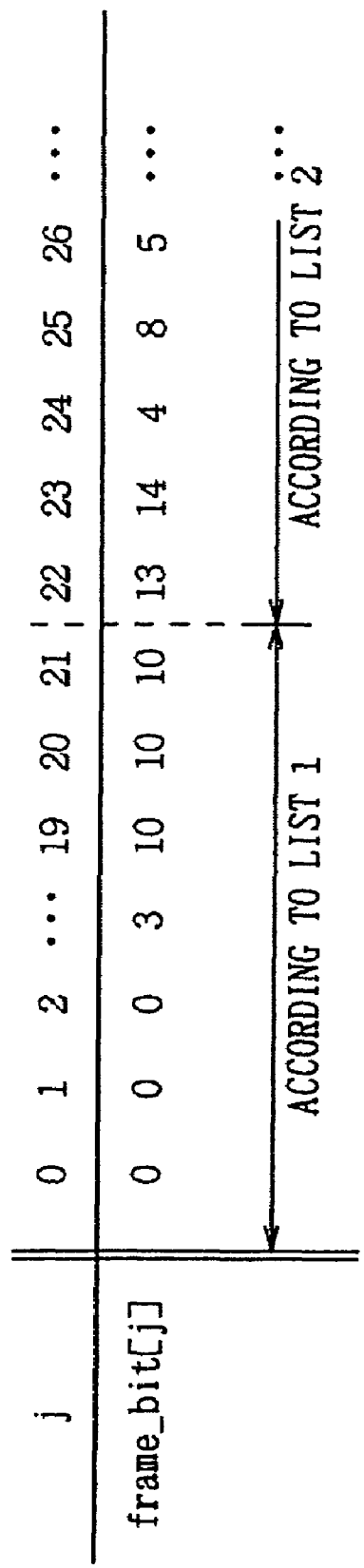
FIG. 14 is a schematic diagram showing the size of encoded data to be transmitted for each frame which is determined by the transmission plan.

Thereby, as shown in FIG. 14, with respect to the first picture (read frame) up to the 22nd picture (read frame), the read plan from the encoder FIFO 33 is made by control of the list 1 to be executed-based on the first video report. With respect to the pictures after the 23rd picture (read frame), the read plan from the encoder FIFO 33 is made by control of the list 2 to be executed based on respective video reports after second video report.

The CPU 39 is able to output the data input to the encoder FIFO 33 to the decoder 104 through the VBV buffer 103 after 22 frames by reading out the size of read frame bits planed in this way, one frame by one frame in succession. Therefore, it is possible to keep the VBV delay as 22 frames constant irrespective of a rate.

Figure 15:
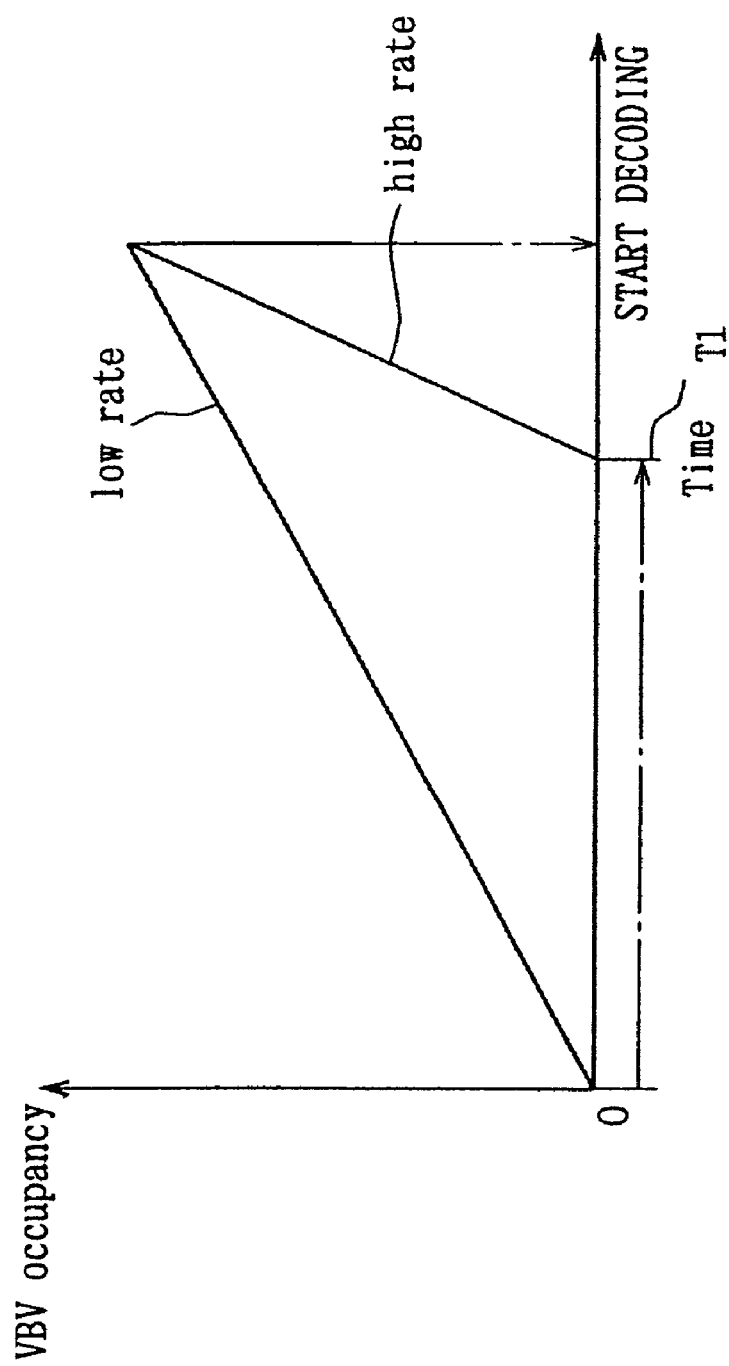
FIG. 15 is a schematic diagram explaining the transmission start timing based on the transmission plan.

Thus, according to the aforementioned configuration, for the change of bit rate at the time of transmitting encoded data, the VBV delay is fixed and the size data to be output is successively calculated every frame, thereby making it possible to continuously obtain data from the VBV buffer 103 without breaks, preventing the VBV buffer 103 from overflow or underflow, irrespective of change of a bit rate. In this connection, FIG. 15 shows a state where read timing from the encoder FIFO 33 is changed by control of the aforementioned list 1 with respect to video data having a high rate and video data having a low rate, and decode start timings for the video data to be output from the video encoder 33 are equal to each other irrespective of their rates.

Note that, in the above-mentioned embodiment, the amount of the VBV delay is equivalent to 22 frames. However, the present invention is not limited thereto and another amount of delay can be applied.

Further, in the above-mentioned embodiment, decoding is started at the time when the VBV buffer 103 becomes full. However, the present invention is not limited thereto and the decoding can be started at the time when the data size set to a predetermined level is stored in the VBV buffer 103.

Furthermore, in the above-mentioned embodiment, the present invention is applied to the case of encoding video data. However, the present invention is not limited thereto and can be widely applied to the case where other data is encoded.

INDUSTRIAL APPLICABILITY

An encoded data outputting apparatus and method can be utilized for the case of multiplexing and transmitting encoded video data.

The invention claimed is:

1. An encoding data outputting method of an encoding apparatus in which the size of each unit of codes to be generated in an encoding means is variable, said method comprising the steps of:
controlling, based on encoding information provided from a decoding buffer to said encoding means for each unit of encoding data, the output size of each of said unit of encoded data to be output from a buffer means provided at an output terminal of said encoding means; and
generating a transmission plan,
wherein said encoded data in said buffer means reaches a maximum capacity after a video buffer verifier (VBV) delay has passed and the encoded data is provided to the decoding buffer in accordance with said transmission plan, and wherein said transmission plan is generated every one video frame.

* * * * *